J. F. BEATTY.
VEHICLE SPRING.
APPLICATION FILED OCT. 26, 1908.
915,326.
Patented Mar. 16, 1909.
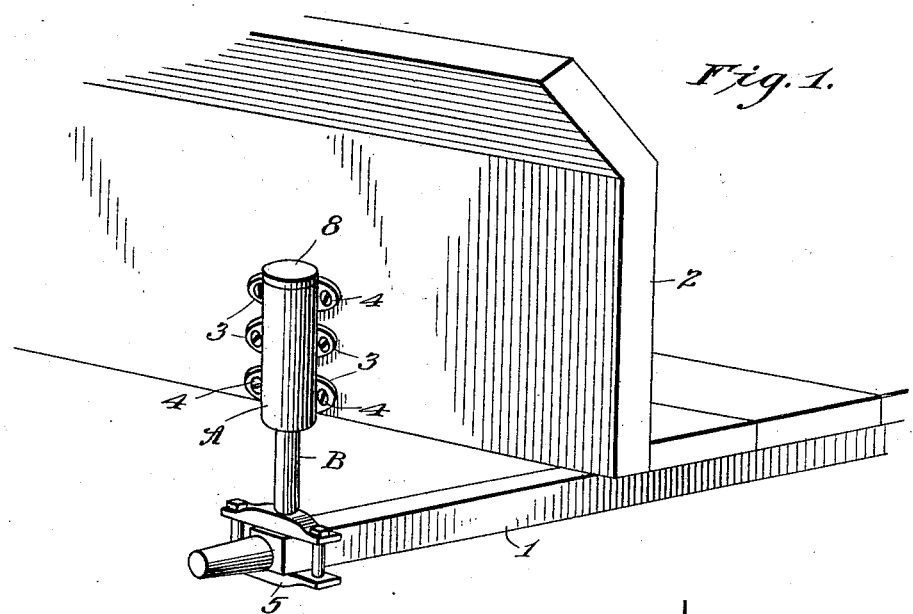
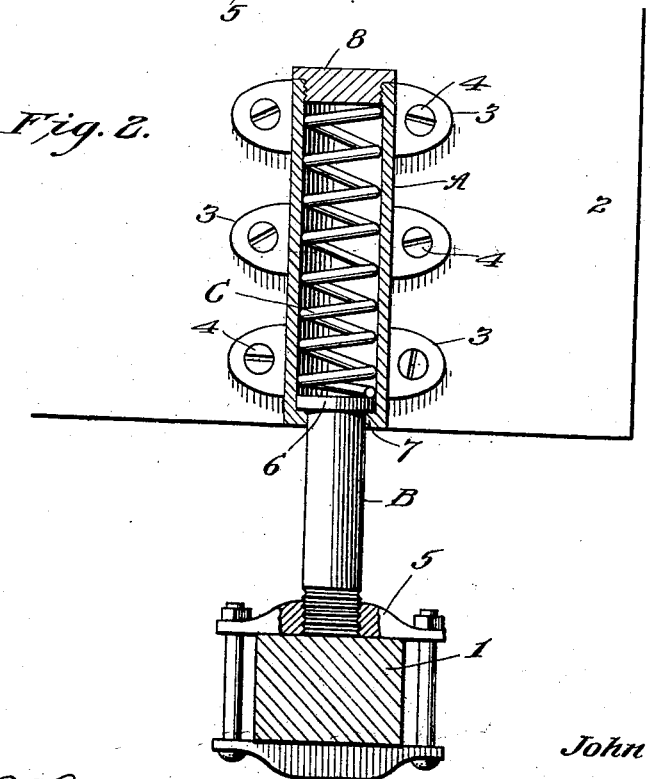
Witnesses
M. C. Lyddane
J. O. L. Mulhall.
Inventor
John F. Beatty
By Joshua R. H. Potts
Attorney

UNITED STATES PATENT OFFICE.

JOHN F. BEATTY, OF MORTON, PENNSYLVANIA.

VEHICLE-SPRING.

No. 915,326.  Specification of Letters Patent.  Patented March 16, 1909.

Application filed October 26, 1908. Serial No. 459,492.

*To all whom it may concern:*

Be it known that I, JOHN F. BEATTY, a citizen of the United States, residing at Morton, in the county of Delaware and State of Pennsylvania, have invented certain new and useful Improvements in Vehicle-Springs, of which the following is a specification.

My invention relates to improvements in vehicle springs, and more particularly to an improved spring for wagons and the like, the object of the invention being to provide a vertically movable plunger in a casing, or vice versa, and a spring located in the casing bearing against the plunger and casing, to elastically support the vehicle on the axle.

A further object is to provide improvements of this character which can be very inexpensively made, which are not liable to become broken or injured in use, and which can be repaired, or parts replaced, by any one of average intelligence in a very short time and without the employment of special tools.

With these and other objects in view the invention consists in certain novel features of construction, and combinations, and arrangements of parts as will be more fully hereinafter described and pointed out in the claim.

In the accompanying drawings Figure 1, is a fragmentary perspective view illustrating my improvements. Fig. 2, is a view in longitudinal section.

1 represents a vehicle axle and 2 a body supported on the axle by my improvements as will be hereinafter explained. It is of course to be understood that I would employ at least two of these springs at the rear axle, and probably two for the front axle, the connection of the spring casing A at the front of the vehicle would of course be made with a movable part of the wagon gear, so that the front axle may pivot. The spring casing or housing A is of cylindrical form and vertically disposed and is provided at opposite sides with perforated ears 3 to receive screws 4 or other securing means to permanently secure the casing A to the vehicle body 2. A yoke 5 of ordinary construction is secured on the axle 1 and the upper cross bar of the yoke is made with a screw threaded opening to receive the threaded lower end of a plunger B, which latter is screwed through the opening in the yoke and bears directly on the axle 1, the latter therefore, directly sustaining the strain and weight of the vehicle. The upper end of the plunger B is made with an enlarged head 6 located in casing A, and the latter is provided at its lower end with an internal annular flange 7 forming a shoulder to limit the movement of the plunger B away from the casing A, or vice versa. A coiled spring C is located in the casing A, bears at its lower end upon the head 6 of plunger B, and at its upper end against a plug 8 screwed into the upper end of casing A. It will thus be seen that when the weight is applied on the vehicle body, the casing A will move down on the plunger B against the action of spring C to elastically support the body and the spring C will cushion the jars and jolts from the axle to render the body support extremely elastic.

In the event of any injury to the spring, the plug 8 can be removed and a new spring inserted, and also lubricant of any kind can be inserted through the upper end of the cylindrical casing to lubricate the sliding contact of the plunger in the casing. Furthermore, as the lower end of the plunger B rests directly upon the axle, no strain whatever is upon the threads of the plunger in the yoke 5. The construction in other respects is a very simple and strong one, the device is not liable to become damaged in use and will sustain great weight on the body.

Of course it is to be understood that according to the use of the vehicle, the spring C will be of the desired tension, and if the vehicle is to be used for heavier or lighter loads, it would be advisable to change the springs in the casing, and for this reason, the invention would appeal to the trade as it would enable the user to get just the amount of elasticity to the body that he should desire.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In a device of the character described, the combination with a vehicle body and an axle, of a vertically disposed tubular casing, integral ears at both sides of the casing secured to the vehicle body, a plug screwed in the upper end of the casing, an internal flange at the lower end of the casing, a yoke on the axle having a screw threaded opening, a plunger screwed into said opening and against the axle, a head on the upper end of the plunger located in the casing, and a coiled spring in the casing between the head of the plunger and the said plug.

In testimony whereof I have signed my name to this specification in the presence of two subscribing witnesses.

JOHN F. BEATTY.

Witnesses:
 JEAN L. BEATTY,
 J. A. L. MULHALL.